United States Patent [19]
Kuno et al.

[11] Patent Number: 5,822,122
[45] Date of Patent: Oct. 13, 1998

[54] IMAGE STABILIZING OPTICAL DEVICE

[75] Inventors: Osamu Kuno; Koji Suzuki; Nobuchika Momochi; Kazuto Kawamata; Norihiko Noguchi, all of Kanagawa, Japan

[73] Assignee: Sony Corporation, Tokyo, Japan

[21] Appl. No.: 723,255

[22] Filed: Sep. 30, 1996

[30] Foreign Application Priority Data

Oct. 12, 1995 [JP] Japan ................................. 7-264436

[51] Int. Cl.$^6$ .......................... G02B 27/64; G03B 7/08
[52] U.S. Cl. ............................ 359/557; 359/554; 396/52
[58] Field of Search .................................. 359/554–557; 376/52–55, 421

[56] References Cited

U.S. PATENT DOCUMENTS

| | | | |
|---|---|---|---|
| 4,780,739 | 10/1988 | Kawakami et al. | 396/54 |
| 4,911,541 | 3/1990 | Alvarez et al. | 359/554 |
| 5,073,017 | 12/1991 | Suda | 359/557 |
| 5,122,908 | 6/1992 | Sporer | 359/557 |
| 5,305,040 | 4/1994 | Enomoto | 359/554 |
| 5,387,999 | 2/1995 | Hayashi | 359/557 |
| 5,444,512 | 8/1995 | Morizumi | 359/554 |
| 5,521,758 | 5/1996 | Hamano | 359/557 |

*Primary Examiner*—Thong Nguyen
*Attorney, Agent, or Firm*—Frommer Lawrence & Haug LLP; William S. Frommer

[57] ABSTRACT

An image stabilizing optical device including an optical system having a first lens located on an object side and a second lens located on an imaging lens side. The first lens and the second lens are opposed to each other with a small space defined therebetween. Opposed surfaces of the first lens and the second lens have the same curvature. The image stabilizing optical device further includes a rotating mechanism located on the same center of curvature of the first and second lenses, for moving the second lens independently in two perpendicular axial directions in a plane perpendicular to an optical axis of the optical system; and a shake detecting mechanism for detecting shakes in the two perpendicular axial directions. The optical system is located in front of an imaging lens of an imaging device in proximity to the imaging lens. The rotating mechanism is driven according to a result of detection from the shake detecting mechanism to control an optical path of light incident on the optical system. Accordingly, image shake due to shaky hand movements in the imaging device can be effectively performed.

5 Claims, 15 Drawing Sheets

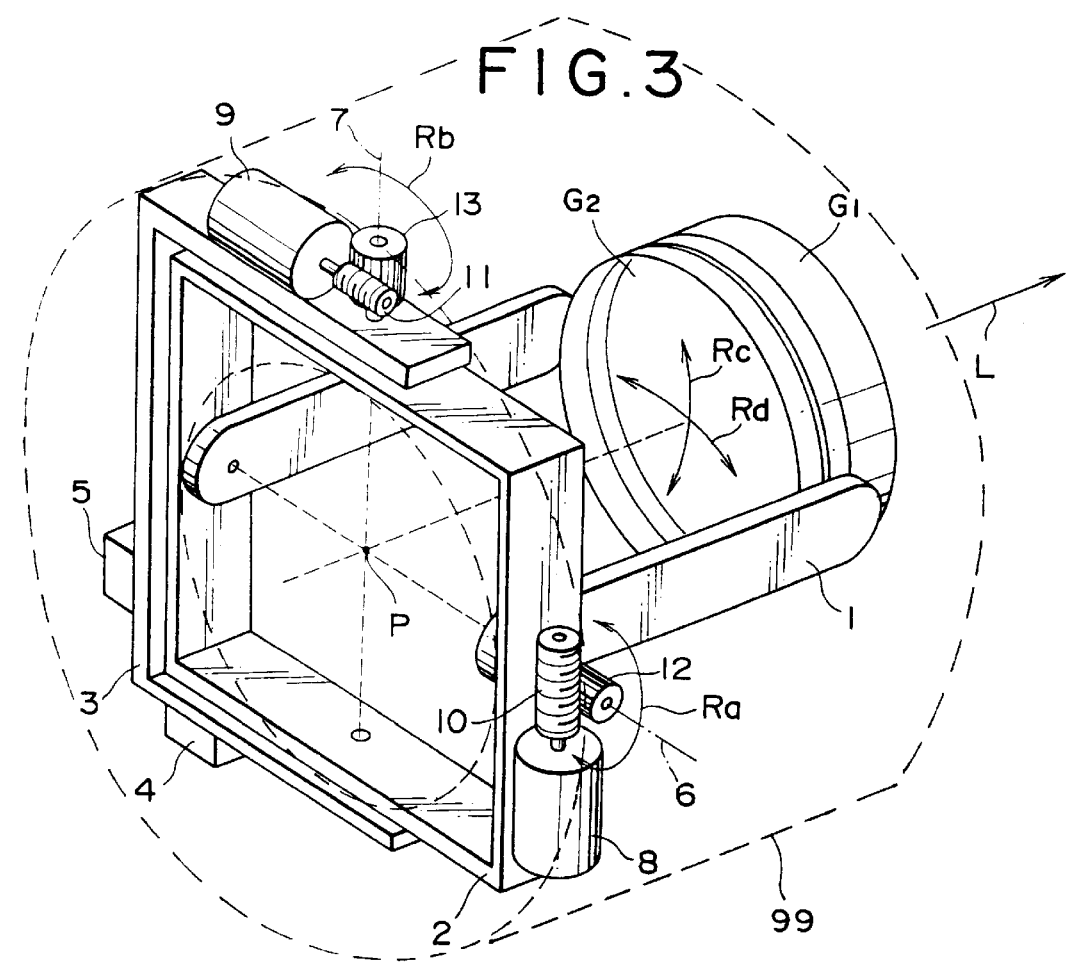

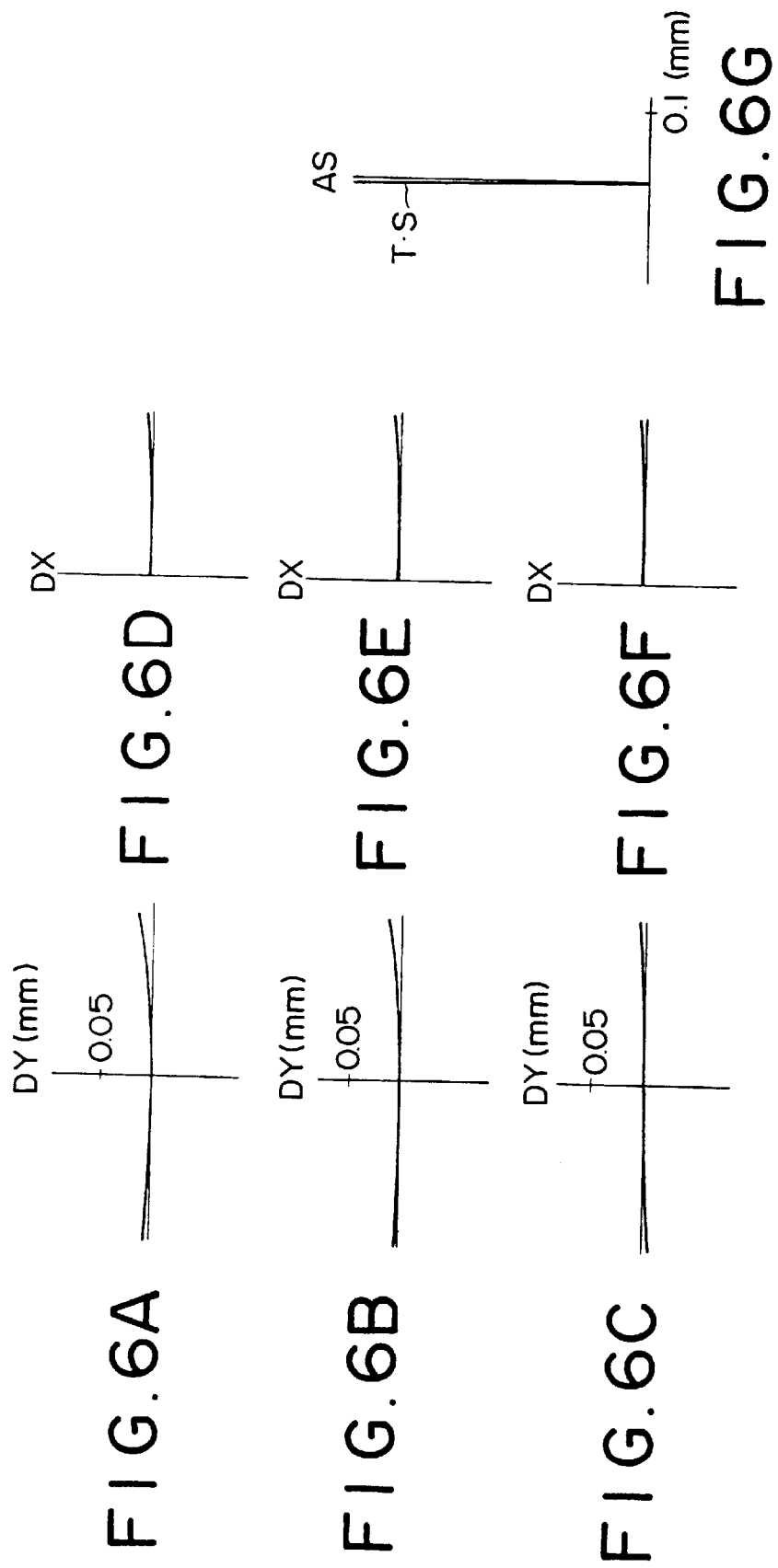

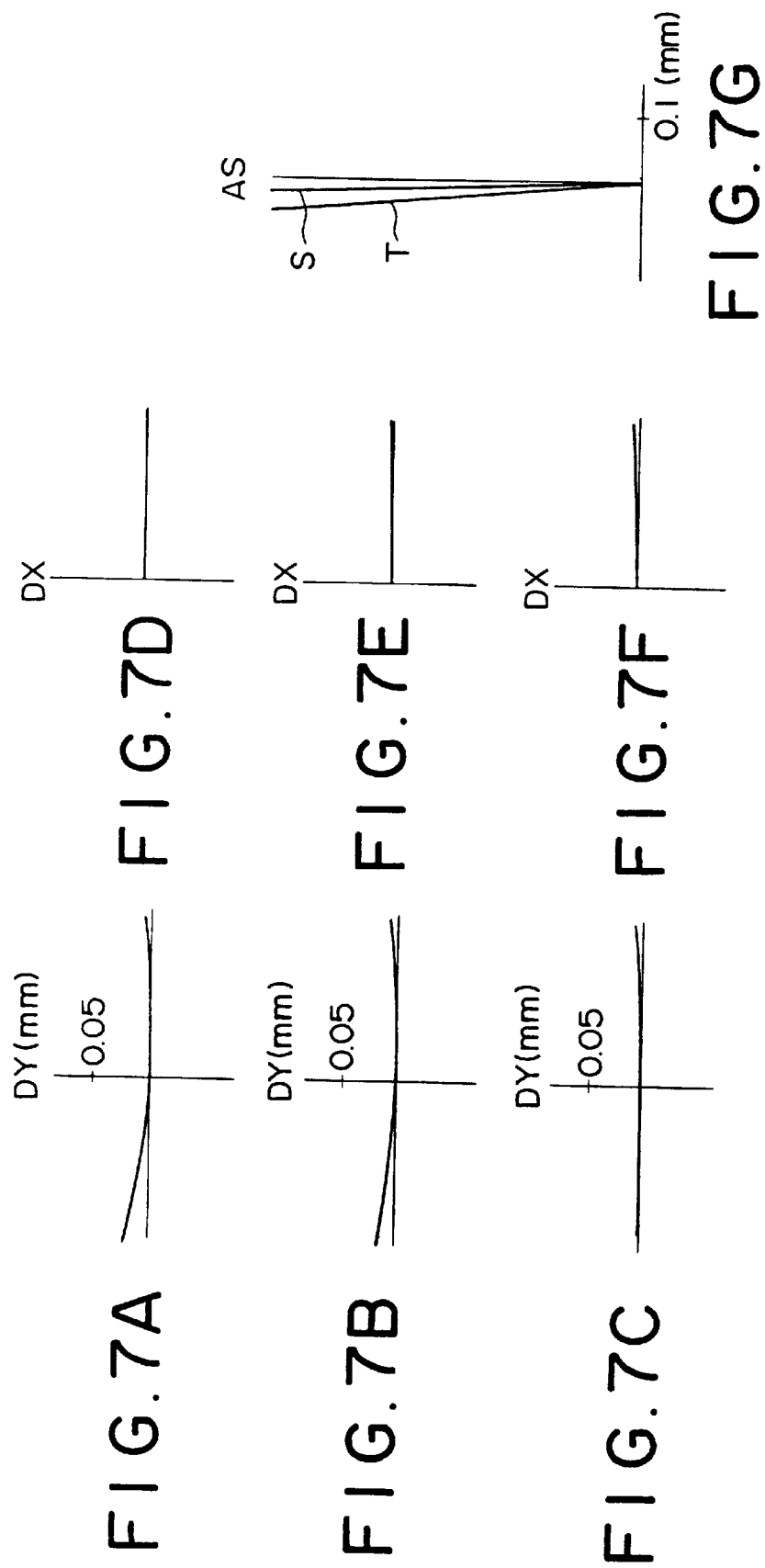

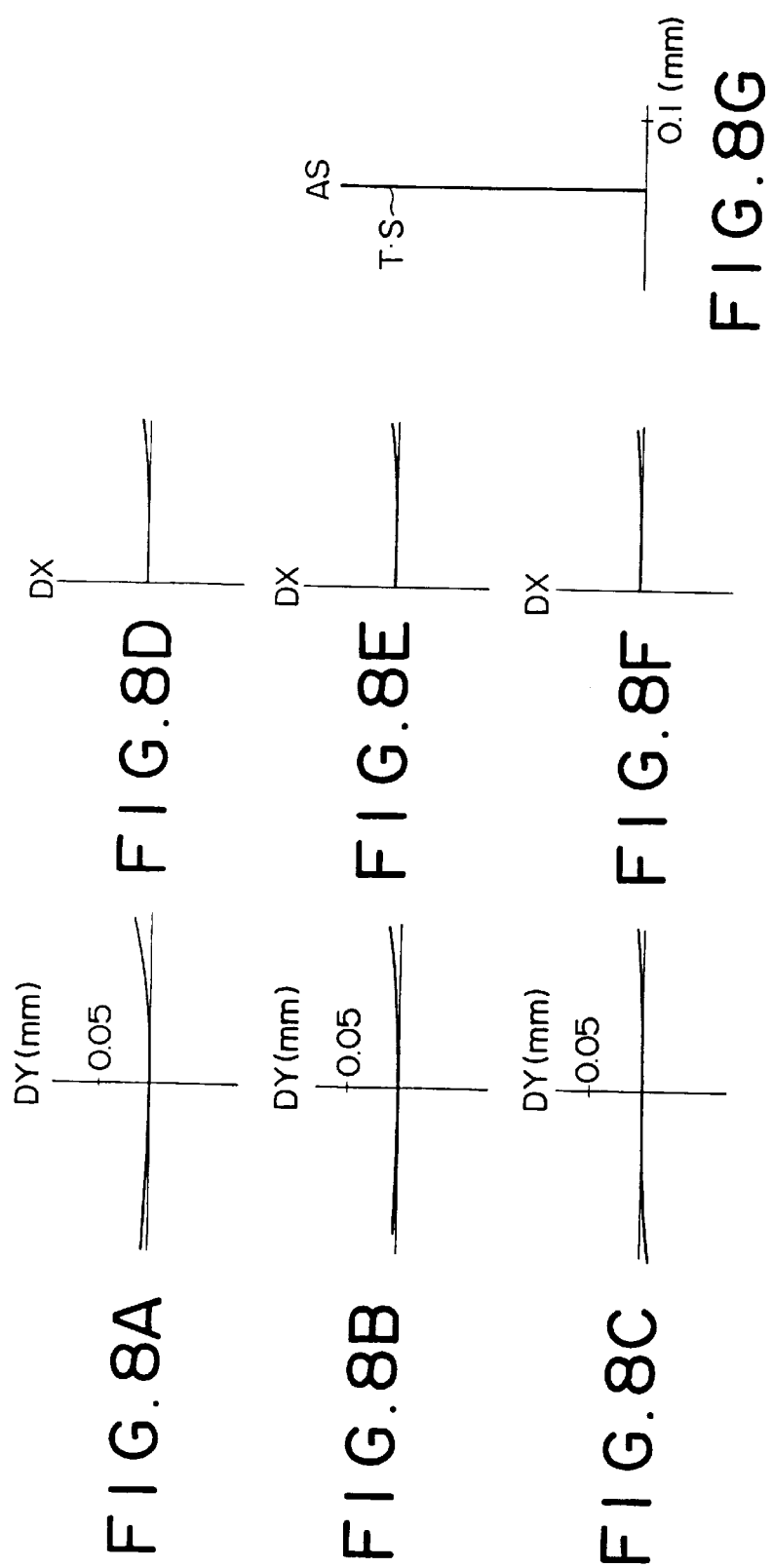

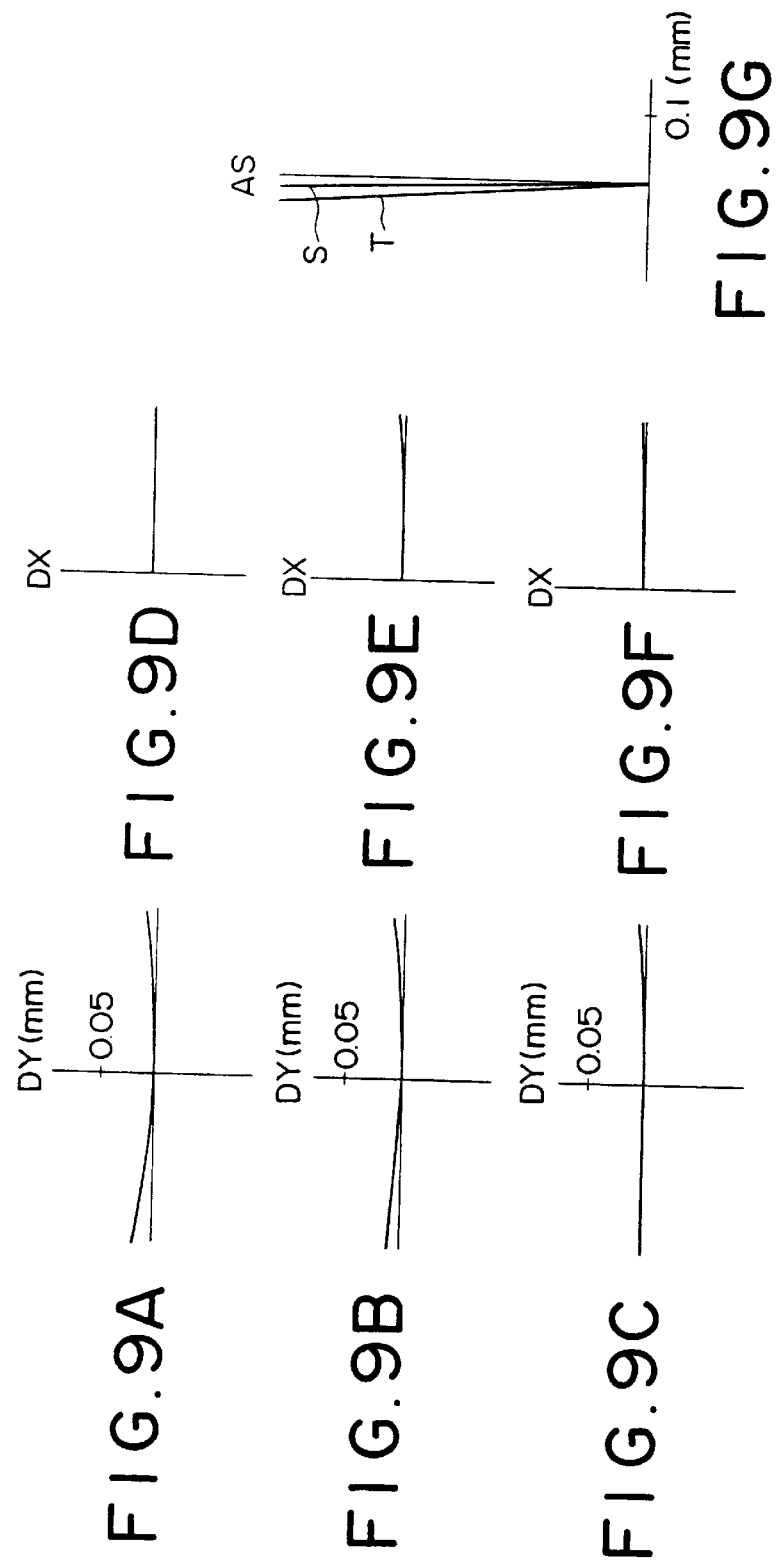

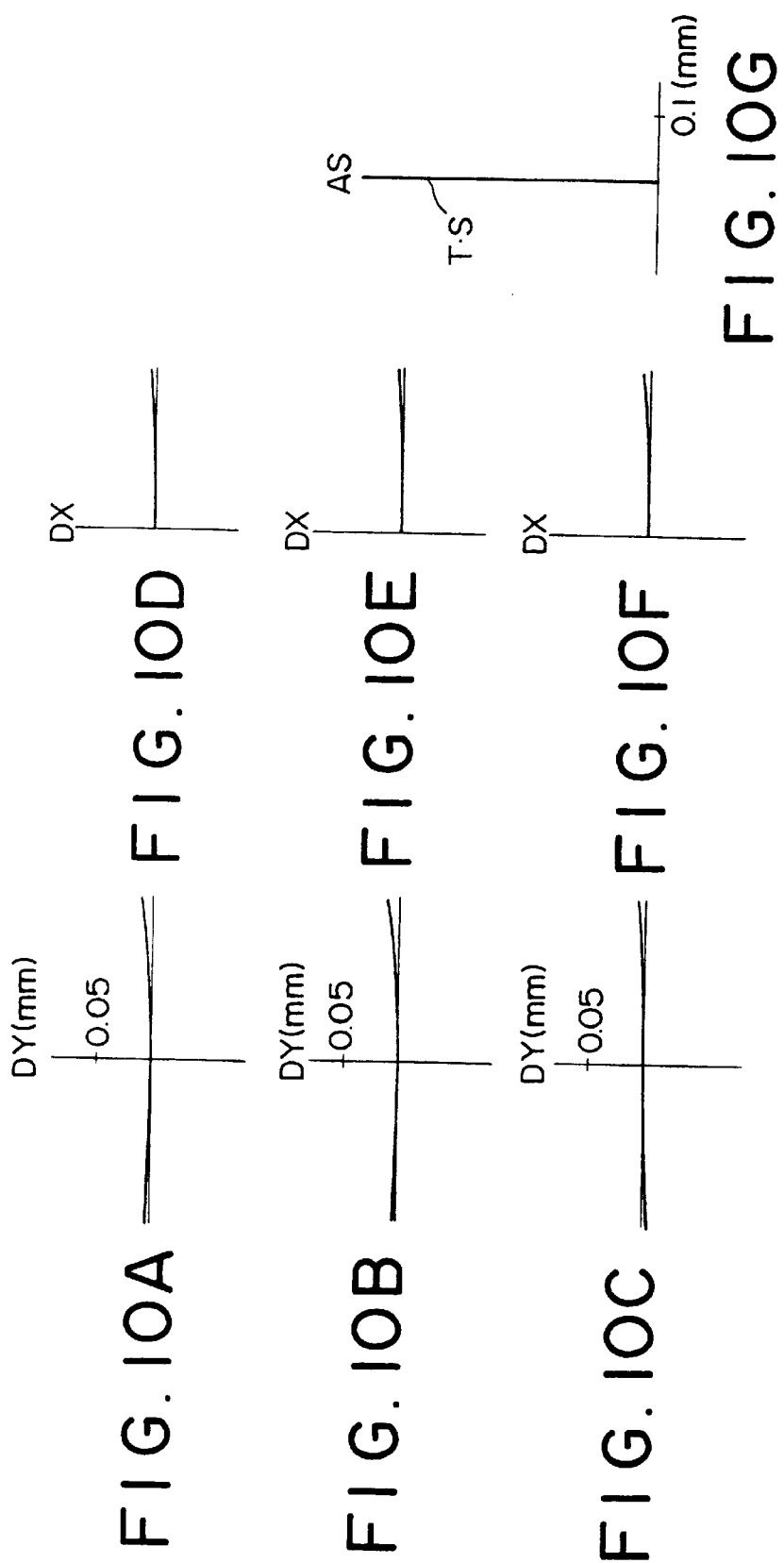

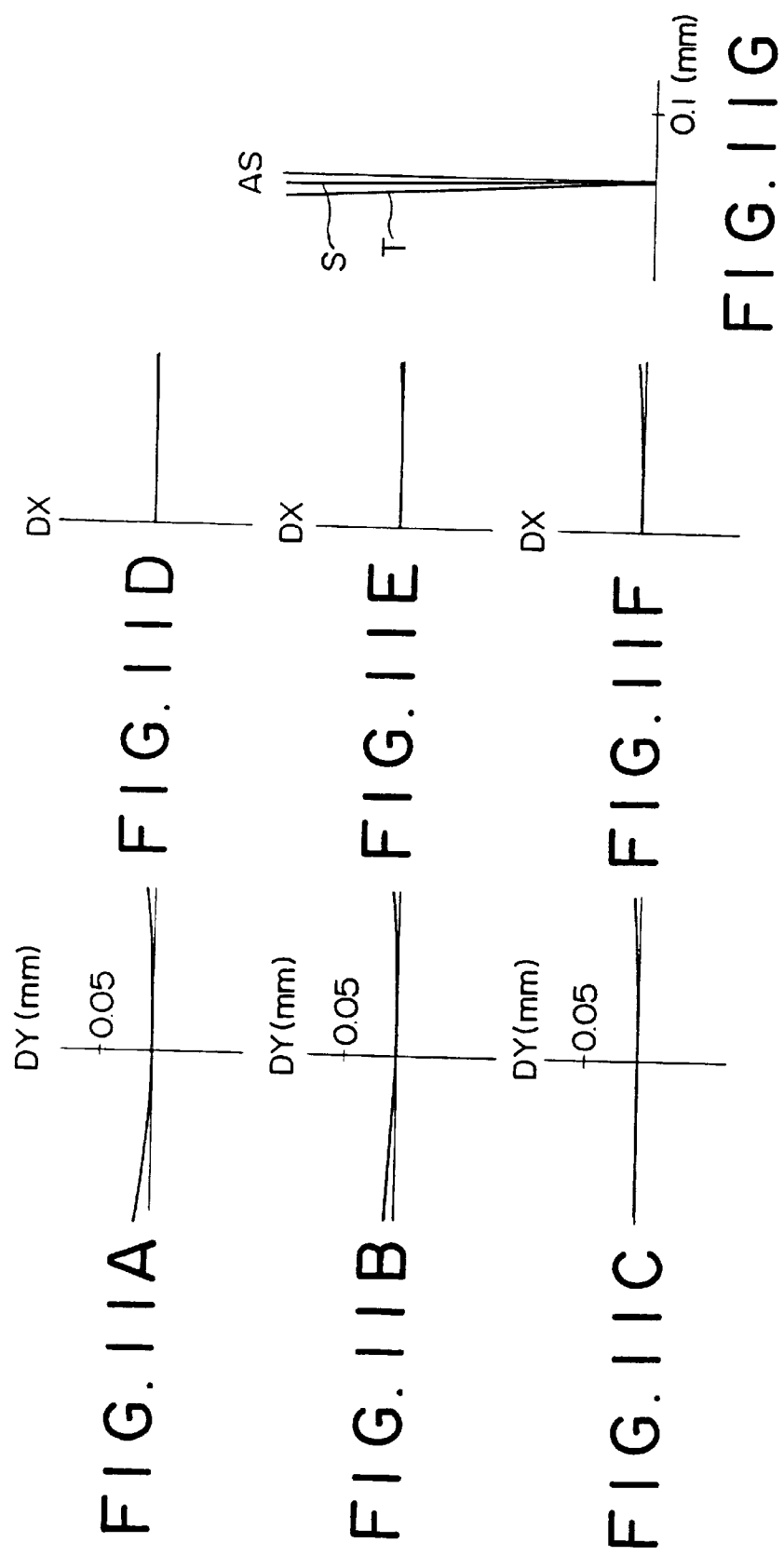

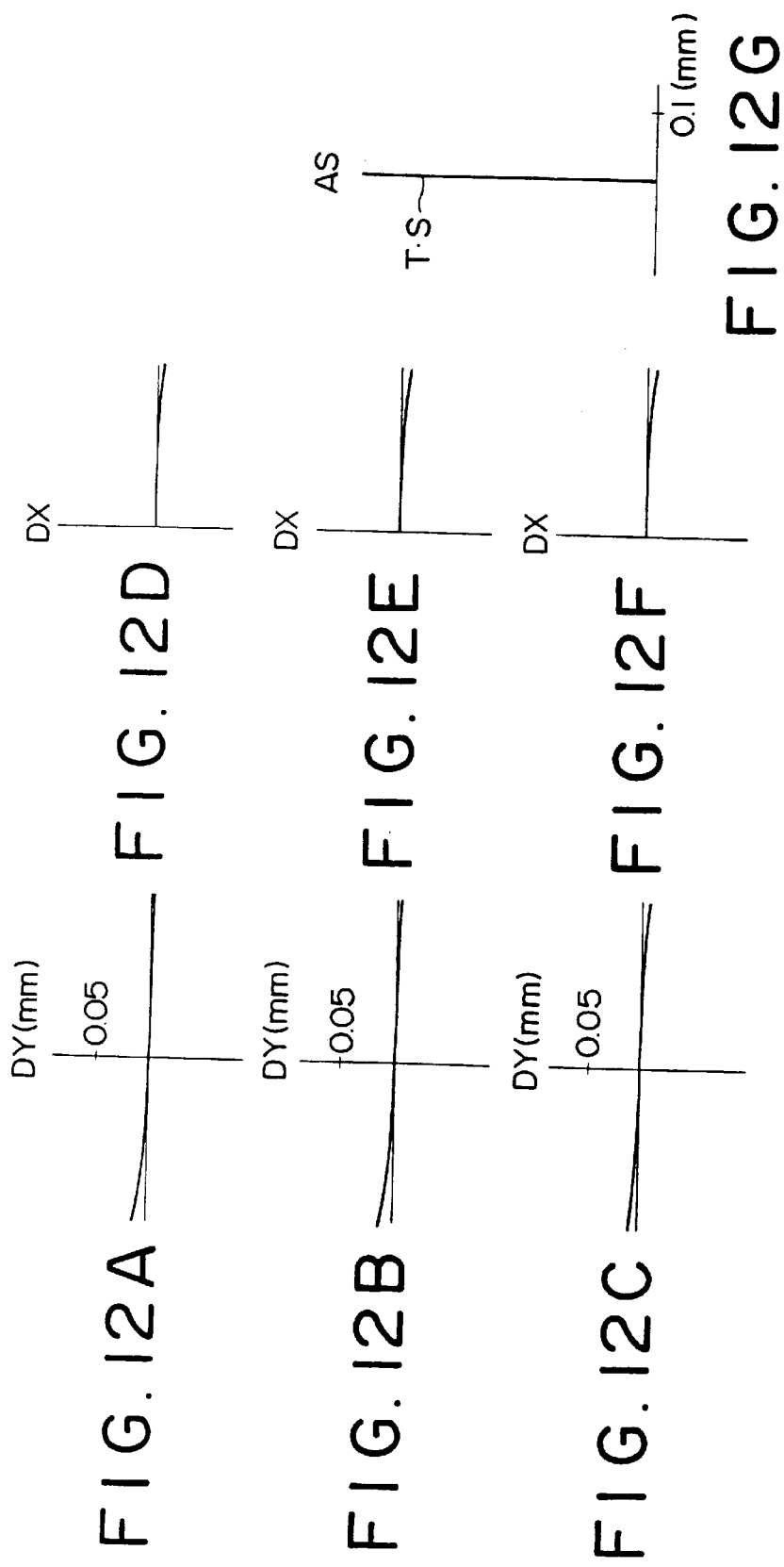

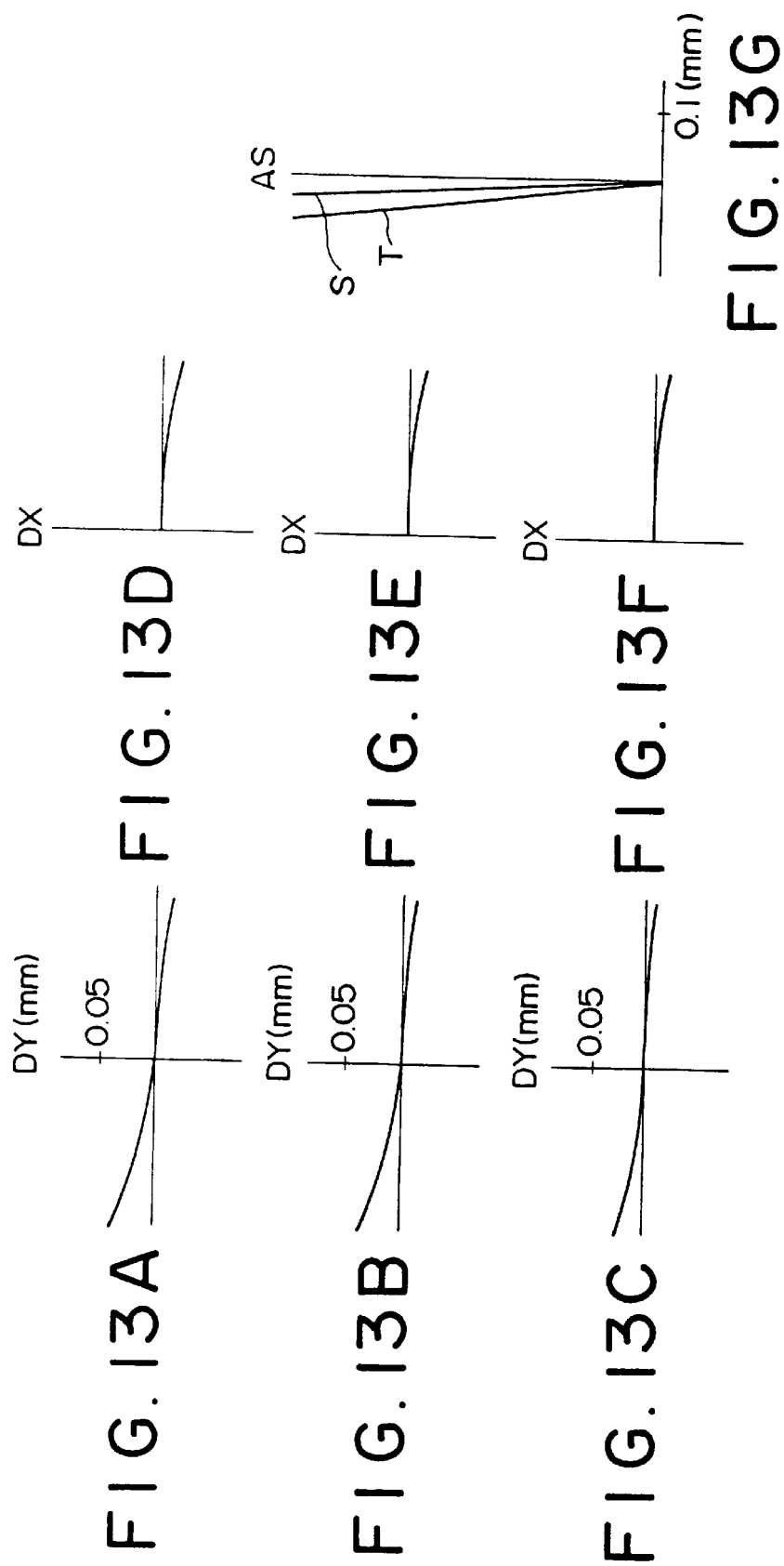

FIG. 15 (RELATED ART)
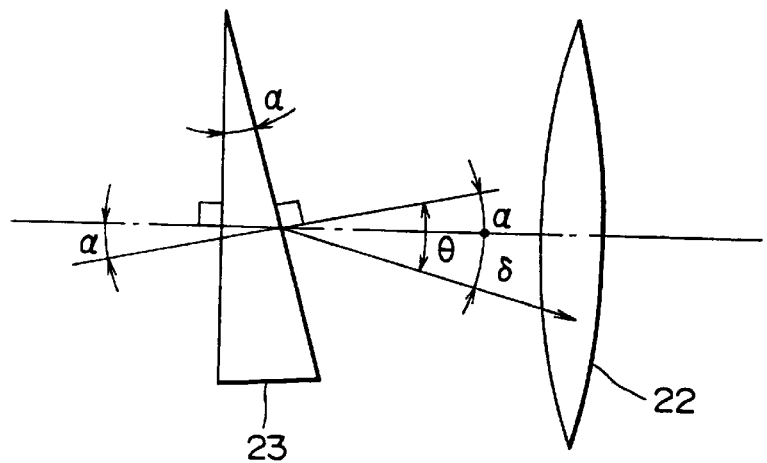
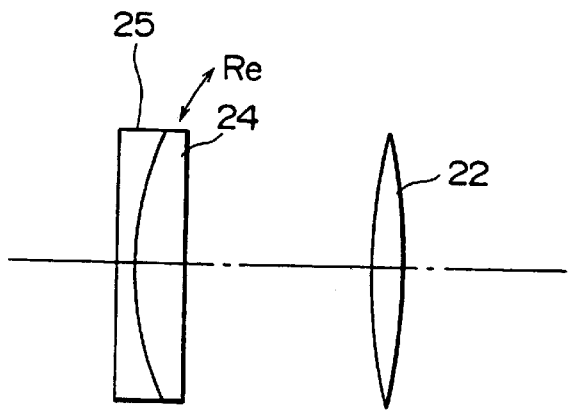
FIG. 16A (RELATED ART)
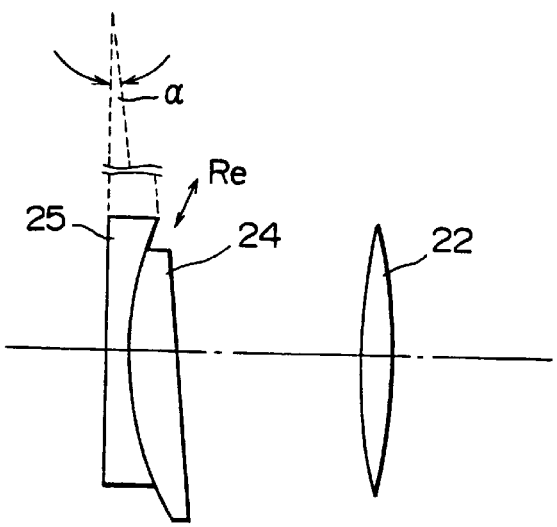
FIG. 16B (RELATED ART)

IMAGE STABILIZING OPTICAL DEVICE

BACKGROUND OF THE INVENTION

The present invention relates to image stabilization for an imaging device, and more particularly to an image stabilizing optical device having a variable-angle optical lens for optically performing image stabilization.

In an imaging device such as a television camera, there is a problem of image shake due to shaky hand movements. Particularly in an imaging device having an imaging optical system having a zoom function, the characteristics of image shake are different according to the magnification of the optical system, so that it is difficult to effectively prevent the image shake over an adjustable range of a focal length.

A related art image stabilizing mechanism will now be described with reference to FIGS. 14A to 16B. The related art image stabilizing mechanism is generally classified into an electronic mechanism of cutting an image frame from an imaging area of a CCD 21 as shown in FIGS. 14A and 14B and an optical mechanism of adjusting an optical axis angle of incident light by combining a plano-convex lens 24 and a plano-concave lens 25 as shown in FIGS. 16A and 16B. In both the electronic mechanism and the optical mechanism, image shake is detected by an angular velocity sensor and is corrected for according to a detected value from the sensor.

The electronic mechanism will first be described with reference to FIGS. 14A and 14B. As shown in FIG. 14A, the CCD 21 used in the electronic mechanism has a large imaging area A0 with horizontal scanning lines larger in number than those defined by the video standard of a television. An actual video is obtained from a video signal by cutting from the area A0 an area A1 having the same number of horizontal scanning lines as that defined by the video standard. In correcting for image shake due to shaky hand movements, the area A1 is moved in the range of the area A0, for example, to an area A2 or an area A3, according to a shake detection signal, so as to eliminate image shake on the CCD 21, and the resultant area A2 or A3 is then cut from the area A0.

The correction power of the above electronic mechanism will now be described with reference to FIGS. 14A and 14B.

With regard to a vertical direction, letting f denote the focal length of an imaging lens 22, 2h0 denote the length of one side (the height) of the area A1, and 2(h+h0) denote the length of one side (the height) of the area A0, a correctable angle θ is given as follows:

$$\tan(\theta 0+\theta)=(h+h0)/f \tag{1}$$

$$\tan\theta 0 = h0/f \tag{2}$$

Since θ0+θ is small, $$\theta 0+\theta = (h+h0)/f \tag{3}$$

$$\theta 0 = h0/f \tag{4}$$

Therefore, $$\theta = h/f \tag{5}$$

Thus, a maximum correction angle can be obtained.

In the case that the CCD 21 has a size of ⅔ inch, the size of the area A0 becomes 8.8 mm×6.6 mm. In this case, a marginal area of correction has a horizontal length of 2.64 mm and a vertical length of 1.98 mm, provided that each length is about 30% of the length of the corresponding side of the area A0. Accordingly, a correction area as the half of the marginal area has a horizontal length of 1.32 mm and a vertical length of 0.99 mm. In the case that the focal length f of the imaging lens 22 is a shorter focal length of 8 mm, the correction angle θ for the vertical direction becomes 0.99/8≈0.124 rad≈7 degrees. Thus, a large correctable angle can be obtained. However, in the case that the focal length f is a longer focal length of 200 mm, the correction angle θ for the vertical direction becomes 0.99/200≈0.005 rad≈0.28 degree. Thus, the correctable angle becomes extremely small. Of course, the same can also apply to the horizontal direction.

Furthermore, according to this electronic image stabilization, the CCD 21 must ensure a large imaging area for correction. As a result, a chip size becomes large to cause an increase in cost. If a CCD conforming with the video standard is used, all the pixels of the CCD cannot be used to unavoidably result in degradation of image quality.

The optical mechanism will now be described with reference to FIGS. 15 to 16B. FIG. 15 shows an example of the optical mechanism. The optical mechanism shown in FIG. 15 has a prism 23 having a variable apex angle located in front of an imaging lens 22. The apex angle of the prism 23 is varied according to a shake detection signal to thereby adjust an optical axis of incident light.

The prism 23 having the variable apex angle is located in front of the imaging lens 22 in such a manner that one surface of the prism 23 is perpendicular to the optical axis. Letting α denote the apex angle of the prism 23, δ denote the deflection angle of outgoing light from the prism 23, and n denote the refractive index of the prism 23, the following equation is given.

$$\sin\theta = \sin(\alpha+\delta) = n\sin\alpha \tag{6}$$

Since θ is small, $$\theta = \alpha+\delta = n\alpha \tag{7}$$

Therefore, $$\delta = (n-1)\alpha \tag{8}$$

Eq. (8) indicates that when the apex angle α is varied ±2 degrees in the case of n=1.5, for example, the deflection angle δ can be changed ±1 degree. The change of ±1 degree of the deflection angle δ is a sufficient value for correction of a shake angle actually occurring in the case that the focal length f of the imaging lens 22 is a longer focal length. However, in the case that the focal length f is a shorter focal length, e.g., f=8 mm, a correction amount becomes 8×tan1°, which is an extremely small value of 0.14 mm on an image sensor in comparison with 0.99 mm in the electronic mechanism mentioned above.

In this manner, according to the above optical mechanism, the optical axis correction angle by the prism 23 located in front of the imaging lens 22 is constant irrespective of the focal length of the imaging lens 22. Accordingly, the optical axis correction angle is not reduced even in the case of a longer focal length, and effectively functions particularly in a zoom-in condition highly sensitive to shaky hand movements. However, in the case of a shorter focal length, a sufficient correction angle cannot be obtained.

Further, while the prism 23 contains a sealed liquid having a constant refractive index to vary the apex angle, it is difficult to increase the size due to viscosity of the liquid, and a problem on high-speed response performance is also present.

FIGS. 16A and 16B show another example of the optical mechanism. As shown in FIG. 16A, the optical mechanism has an optical system configured by combining a plano-convex lens 24 and a plano-concave lens 25 in such a manner that a convex surface of the lens 24 faces a concave surface of the lens 25 having the same curvature as that of the convex surface of the lens 24. As shown in FIG. 16B, the correction for image shake is performed by moving the plano-concave lens 25 in a direction depicted by an arrow Re to thereby equivalently vary the apex angle α of the prism 23 shown in FIG. 15, thus changing an angle of incidence upon an imaging lens 22. This technique has already been disclosed in Japanese Patent Laid-open Nos. Sho 59-26930 and Hei 6-281889. However, also in this example, there are problems such that large aberrations occur and a drive mechanism is complicated.

SUMMARY OF THE INVENTION

It is accordingly an object of the present invention to provide an image stabilizing optical device which can effectively prevent image shake due to shaky hand movements in an imaging device having an imaging system having a variable focal length, with a high image quality being maintained irrespective of a set value of the focal length.

According to the present invention, there is provided an image stabilizing optical device comprising an optical system comprising a first lens located on an object side and a second lens located on an imaging lens side, the first lens and the second lens being opposed to each other with a small space defined therebetween, opposed surfaces of the first lens and the second lens having the same curvature; a rotating means located on the same center of curvature of the first and second lenses, for moving the second lens independently in two perpendicular axial directions in a plane perpendicular to an optical axis of the optical system; and a shake detecting means for detecting shakes in the two perpendicular axial directions; the optical system being located in front of an imaging lens of an imaging device in proximity to the imaging lens; the rotating means being driven according to a result of detection from the shake detecting means to control an optical path of light incident on the optical system.

An Abbe number Vd1 of the first lens and an Abbe number Vd2 of the second lens satisfy a condition of $-1.5 < Vd1 - Vd2 < 1.5$.

A focal length f of the second lens satisfies a condition of $400 \text{ mm} < |f| < 700 \text{ mm}$.

A radius of curvature of a surface of the second lens on the imaging lens side satisfies a condition of $|r| > 400 \text{ mm}$.

A synthetic focal length of the first lens and the second lens is of an afocal system.

The first lens is formed of glass, and the second lens is formed of polycarbonate resin. Alternatively, the first lens is formed of glass, and the second lens is formed of polymethyl methacrylate resin.

By adding the optical system according to the present invention to a related art imaging device, image shake can be simply corrected for with a high image quality being maintained. Further, since the movable second lens is formed of a resin material, a higher-speed correcting operation can be realized.

By the combination of the Abbe numbers as specified above, an increase in chromatic aberration can be prevented.

Since the opposed surfaces of the first lens and the second lens have the same curvature, the space between the first lens and the second lens does not change according to the height of the rays of incident light when the second lens is moved. Therefore, an increase in coma and astigmatism can be prevented.

The optical system consisting of the first and second lenses forms an afocal system, so that no movement of an image plane occurs to thereby prevent focal shift.

Other objects and features of the invention will be more fully understood from the following detailed description and appended claims when taken with the accompanying drawings.

BRIEF DESCRIPTION OF THE DRAWINGS

FIG. 3 is a perspective view showing a control mechanism of the image stabilizing optical device according to the present invention;

FIGS. 6A to 6G are views showing aberrations on an image forming surface when a movable lens of a lens system shown in Tables 1 and 2 is in a proper position on the optical axis;

FIGS. 7A to 7G are views similar to FIGS. 6A to 6G in the condition that the movable lens is rotated to move an image on the image forming surface;

FIGS. 8A to 8G are views showing aberrations on an image forming surface when a movable lens of a lens system shown in Tables 3 and 4 is in a proper position on the optical axis;

FIGS. 9A to 9G are views similar to FIGS. 8A to 8G in the condition that the movable lens is rotated to move an image on the image forming surface;

FIGS. 10A to 10G are views showing aberrations on an image forming surface when a movable lens of a lens system shown in Tables 5 and 6 is in a proper position on the optical axis;

FIGS. 11A to 11G are views similar to FIGS. 10A to 10G in the condition that the movable lens is rotated to move an image on the image forming surface;

FIGS. 12A to 12G are views showing aberrations on an image forming surface when a movable lens of a lens system shown in Tables 7 and 8 is in a proper position on the optical axis;

FIGS. 13A to 13G are views similar to FIGS. 12A to 12G in the condition that the movable lens is rotated to move an image on the image forming surface;

FIG. 15 is a view for illustrating a related art optical shake correcting mechanism;

FIG. 16A is a view showing the configuration of another related art optical shake correcting mechanism; and FIG. 16B is a view similar to FIG. 16A, showing the operation of the mechanism shown in FIG. 16A.

DETAILED DESCRIPTION OF THE PREFERRED EMBODIMENTS

Some preferred embodiments of the present invention will now be described with reference to FIGS. 1A to 13G and Tables 1 to 8.

The image stabilization by the correction for image shake according to the present invention is achieved by providing an optical system consisting of two lenses in front of a related art imaging optical system such as a television camera, and adjusting a relative positional relation between the two lenses to change an optical path of light incident on the imaging optical system, thereby preventing the shake of an image on an image sensor.

First Preferred Embodiment

Figure 1A:
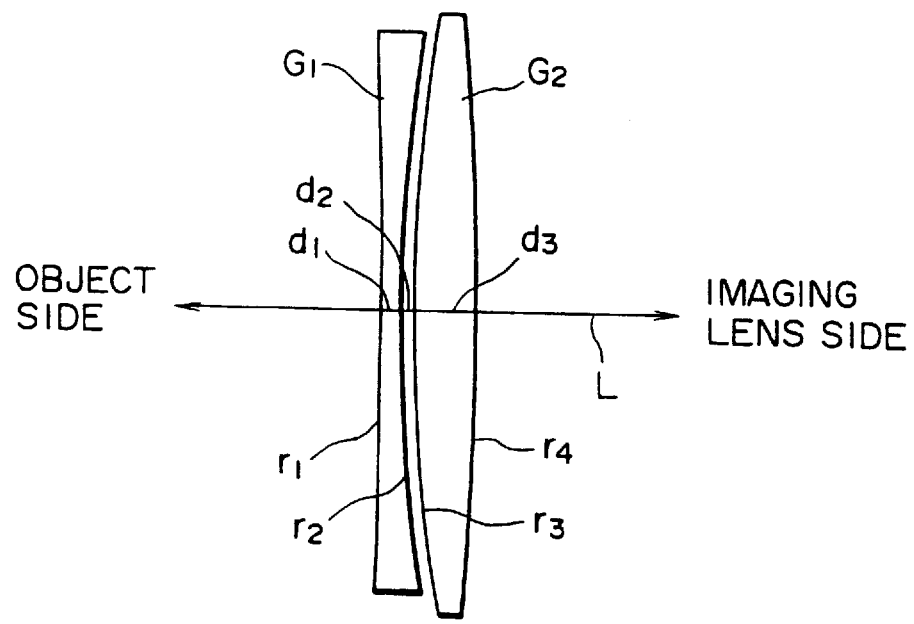
FIG. 1A is a sectional side view showing the configuration of a first preferred embodiment of the optical system of the image stabilizing optical device according to the present invention.
Figure 1B:
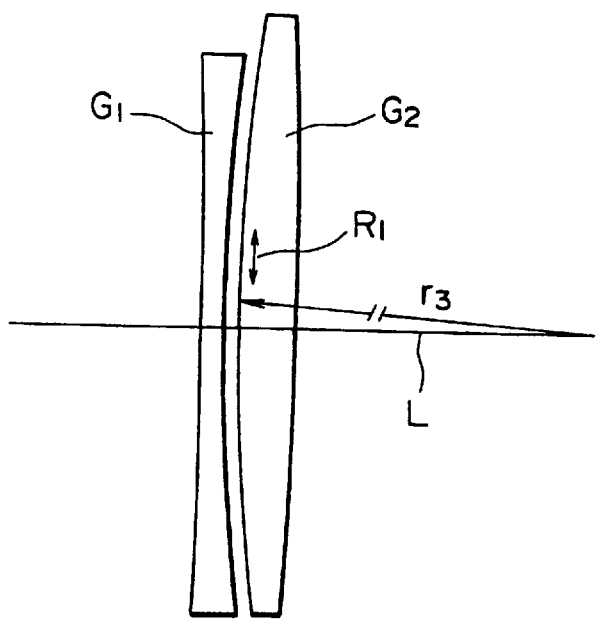
FIG. 1B is a view similar to FIG. 1A, showing the operation of the first preferred embodiment.

FIGS. 1A and 1B show a first preferred embodiment of the present invention. As shown in FIG. 1A, a first lens G1 located on the object side is a concave lens having a radius of curvature r1 whose sign is minus and a radius of curvature r2 whose sign is plus. A second lens G2 located on the imaging lens side is a convex lens having a radius of curvature r3 whose sign is plus and a radius of curvature r4 whose sign is minus. The first and second lenses G1 and G2 are combined so as to have the same optical axis L. The first lens G1 has a thickness d1 at its center, and the second lens G2 has a thickness d3 at its center. The first and second lenses G1 and G2 are spaced a distance d2 from each other.

The sign "plus" means that the center of curvature is located on the imaging lens side, and the sign "minus" means that the center of curvature is located on the object side. The same meaning entirely applies to the following description.

FIG. 1B shows a condition that the second lens G2 is rotated in the direction of an arrow R1 about the center of the curvature whose radius is r3 to adjust an optical path of incident light. Although not shown in FIG. 1B, the direction of rotation of the second lens G2 also includes a direction perpendicular to the arrow R1 (i.e., a direction perpendicular to the sheet plane of FIG. 1B). Thus, the lens G2 is designed to rotate in a direction toward an arbitrary position present in a plane perpendicular to the optical axis L. The detail of this operation will be hereinafter described with reference to FIG. 3.

In this preferred embodiment, the rotatable second lens G2 is formed of PMMA (polymethyl methacrylate) resin which is light in weight. In consideration of Condition 1 to be hereinafter described, the first lens G1 is formed of glass satisfying Condition 1, selected from K, BAK, SK, and LAK which are the symbols defined by Shot, Inc., or selected from NSL, BAL, BSM, and LAL which are the symbols defined by Ohara, Inc.

The conditions of the optical system used in the present invention will now be described.

Condition 1:

The Abbe number Vd1 of the first lens G1 and the Abbe number Vd2 of the second lens G2 satisfy the following condition.

$$-1.5 < Vd1 - Vd2 < 1.5 \quad (9)$$

If this condition is not satisfied, chromatic aberration is increased.

In general, letting nd, nF, and nC denote the refractive index for the spectrum d line (wavelength: 587.56 nm), the refractive index for the spectrum F line (wavelength: 486.13 nm), and the refractive index for the spectrum C line (wavelength: 656.27 nm), respectively, an Abbe number Vd is expressed as follows:

$$Vd = (nd-1)/(nF-nC) \quad (10)$$

Condition 2:

The radii of curvature r2 and r3 of the opposed surfaces of the first and second lenses G1 and G2 satisfy the following condition.

$$r2 = r3 \quad (11)$$

If this condition is not satisfied, the space between the first lens G1 and the second lens G2 changes according to the height of the rays of incident light upon rotation of the second lens G2, causing an increase in coma and astigmatism.

The coma is a phenomenon (off-axis spherical aberration) such that when light emerging from an off-axis object point is passed through a lens to form an image, the light is not collected at one point because of different magnifications at different zones in the lens, but is conically collected to form an image like the flare of a comet.

The astigmatism is a phenomenon such that when light emerging from an off-axis object point is passed through a lens to form an image, a focal point is divided into a point in a tangential direction and a point in a direction (a radial direction) perpendicular to the tangential direction. An intermediate image becomes elliptical.

Condition 3:

The focal length f of the second lens G2 satisfies the following condition.

$$400 \text{ mm} < |f| < 700 \text{ mm} \quad (12)$$

If this condition is not satisfied, that is, if the focal length f is excessively large, the amount of rotation of the lens G2 must be enlarged for the correction for image shake, whereas if the focal length f is excessively small, aberrations are increased.

Condition 4:

The radius of curvature r of the surface of the second lens G2 on the imaging lens side satisfies the following condition.

$$|r| > 400 \text{ mm} \quad (13)$$

This condition is one required from the viewpoint of formability of the plastic material.

Condition 5:

A synthetic focal length of the combined first lens G1 and second lens G2 is of an afocal system.

If this condition is not satisfied, a focal position by the imaging lens changes.

The synthetic focal length is a focal length in the case that a plurality of lenses having individual focal lengths lie on the same optical axis, these lenses are regarded as a single lens in view of the behavior of final rays of light.

The afocal system is a system in the case that the synthetic focal length of plural combined concave and convex lenses is extremely large ($\sim\infty$). Accordingly, this system has no influence on other optical systems.

Figure 4:
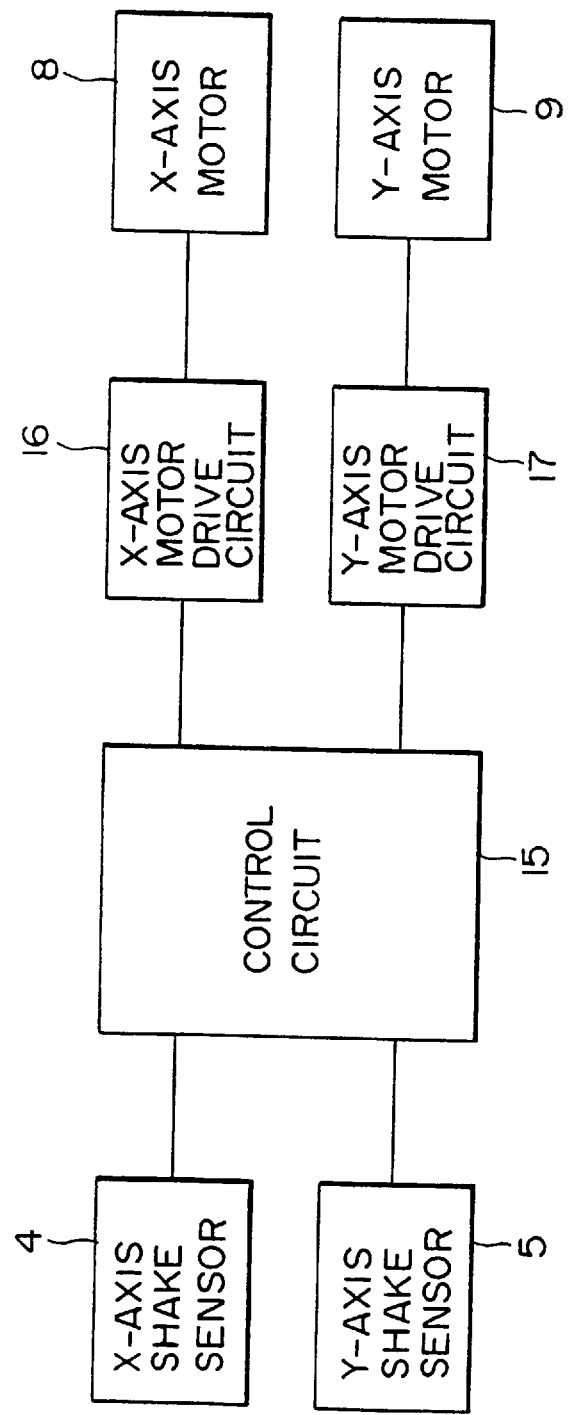
FIG. 4 is a block diagram of a control system of the image stabilizing optical device according to the present invention.

A drive mechanism and a control system of the image stabilizing optical device will now be described with reference to FIGS. 3 to 5.

FIG. 3 is a schematic perspective view of an example of a mechanism for rotating the second lens G2. The first lens G1 is fixed to a housing 99 of the image stabilizing optical device, and the second lens G2 is supported in opposition to the first lens G1 so as to be rotatable in two perpendicular axial directions in a plane perpendicular to the optical axis L. That is, the lens G2 is fixed to a pair of X-axis frames 1. The X-axis frames 1 are supported to a Y-axis frame 2 so as to be rotatable about an X-axis 6 in a direction depicted by an arrow Ra (pitching direction). The Y-axis frame 2 is supported to a fixed frame 3 so as to be rotatable about a Y-axis 7 in a direction depicted by an arrow Rb (yawing direction). An X-axis shake sensor 4 and a Y-axis shake sensor 5 for individually detecting components of shake of the imaging device in the two perpendicular axial directions in the plane perpendicular to the optical axis L are fixed to the fixed frame 3. The fixed frame 3 is fixed to the housing 99 of the image stabilizing optical device as similarly to the lens G1.

The configuration of a rotating mechanism for the lens G2 will now be described. The rotating mechanism includes a gear 12 fixed to one of the X-axis frames 1 so as to rotate integrally with the X-axis frames 1, and an X-axis motor 8 fixed to the Y-axis frame 2 and having a rotating shaft on which a gear 10 is mounted and meshes with the gear 12 to generate torque about the X-axis 6, thereby providing rotation in the direction of the arrow Ra. The rotating mechanism further includes a gear 13 fixed to the Y-axis frame 2 so as to rotate integrally with the Y-axis frame 2, and a Y-axis motor 9 fixed to the fixed frame 3 and having a rotating shaft on which a gear 11 is mounted and meshes with the gear 13 to generate torque about the Y-axis 7, thereby providing rotation in the direction of the arrow Rb.

The intersection P of the X-axis 6 and the Y-axis 7 coincides with the center of curvature of the surface of the lens G2 opposed to the lens G1. In the configuration shown in FIG. 3, the intersection P is located on the imaging lens side. However, depending upon curvature, the intersection P may be located on the object side.

The operation of optical axis correction will now be described with reference to FIGS. 3 and 4. Shake signals corresponding to the components in the two perpendicular axial directions are detected by the X-axis shake sensor 4 and the Y-axis shake sensor 5 both provided on the fixed frame 3 integrally mounted on the imaging device. The shake signals are input into a control circuit 15, and then processed in the control circuit 15. Thereafter, drive signals are output from the control circuit 15 to drive the X-axis motor 8 and the Y-axis motor 9 through an X-axis motor drive circuit 16 and a Y-axis motor drive circuit 17, respectively.

The X-axis motor 8 driven according to the shake signal corresponding to the X-axis component rotates the gear 12 meshing with the gear 10 in the direction of the arrow Ra, thereby rotating the lens G2 together with the X-axis frames 1 in a direction depicted by an arrow Rc. Similarly, the Y-axis motor 9 driven according to the shake signal corresponding to the Y-axis component rotates the gear 13 meshing with the gear 11 in the direction of the arrow Rb, thereby rotating the lens G2 together with the Y-axis frame 2 and the X-axis frames 1 in a direction depicted by an arrow Rd. In this manner, the lens G2 can be rotated in a direction toward an arbitrary position in the plane perpendicular to the optical axis L, thereby allowing adjustment of an optical path of incident light.

The detection of shake may be performed not only by using an angular velocity sensor or an acceleration sensor, but also by comparing images between a present frame and a previous frame. Further, the configuration of the control mechanism is not limited to that mentioned above, but any configuration having a similar function may be adopted.

Figure 5:
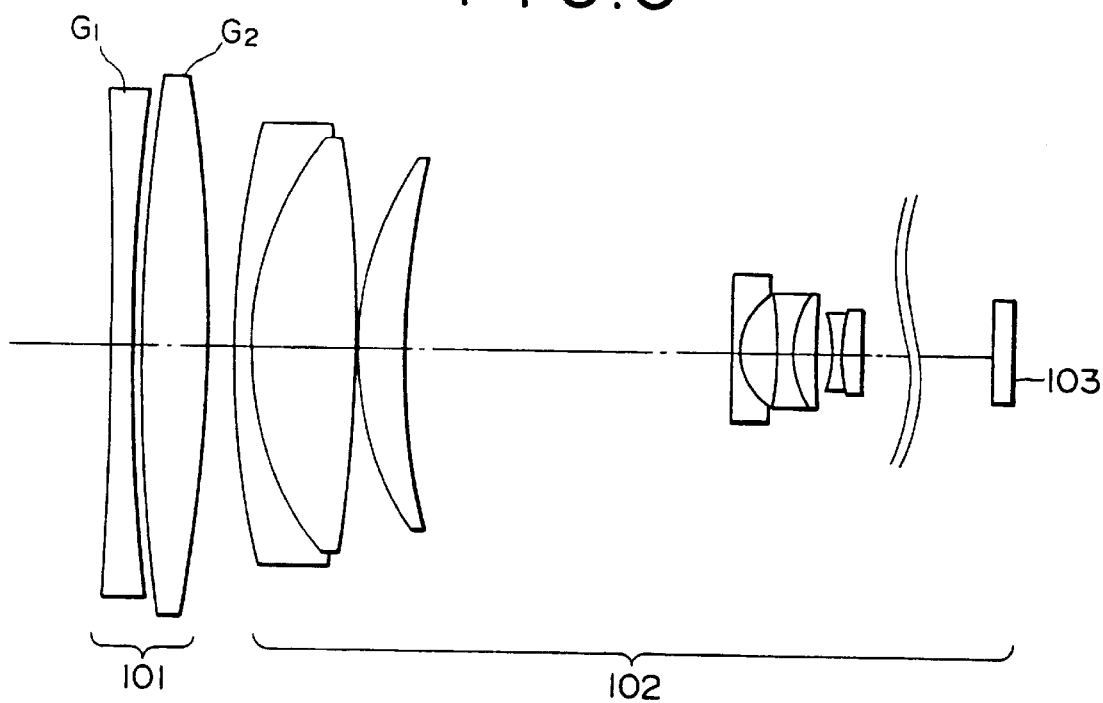
FIG. 5 is a sectional side view showing an example configured by mounting the image stabilizing optical device to a related art imaging optical system.
Figure 14A:
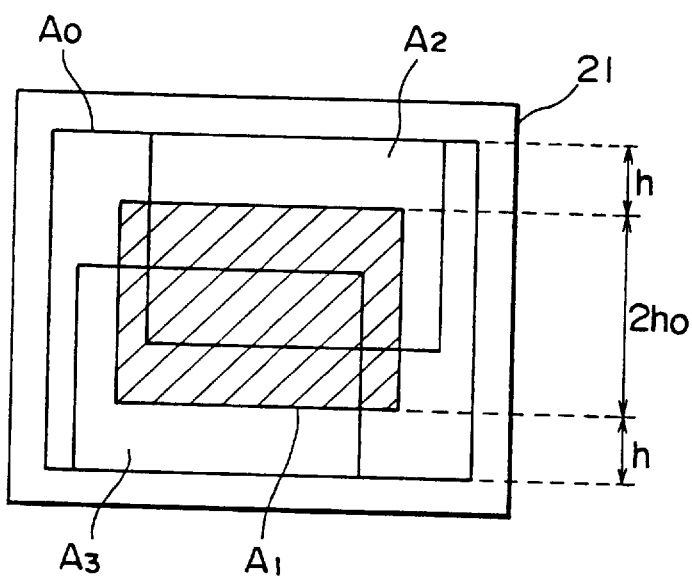
FIG. 14A is a view showing an image cutting frame on a CCD, for illustrating a related art electronic shake correcting mechanism.
Figure 14B:
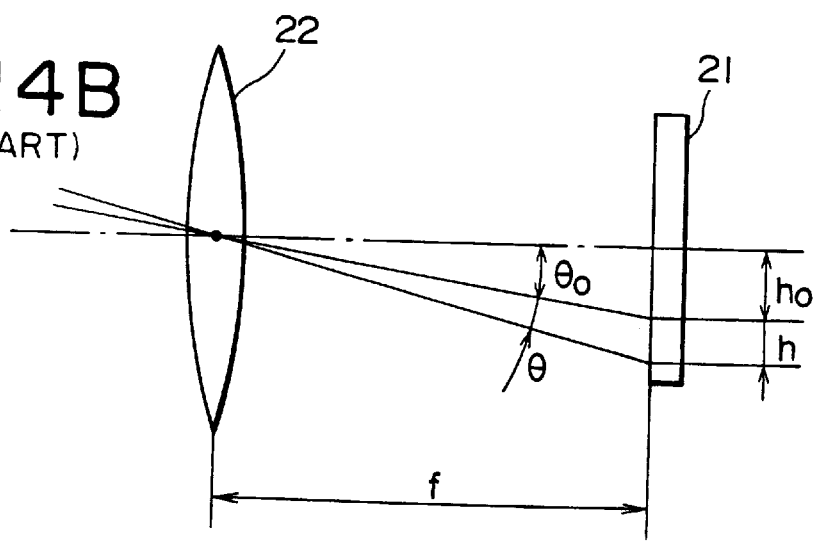
FIG. 14B is a view showing calculation of a correction angle of an optical axis corresponding to the image cutting frame shown in FIG. 14A.

FIG. 5 shows an imaging system configured by mounting a shake correcting optical system 101 to a related art imaging optical system 102. That is, the rotatable lens G2 constituting the correcting optical system 101 is mounted in front of the related art imaging optical system 102 in such a manner that the optical axis of the correcting optical system 101 coincides with the optical axis of the imaging system 102. By using the principle that an image forming position on an image sensor 103 is moved by moving the lens G2, the lens G2 is moved in such a direction as to cancel movement of an image on the image sensor 103 due to shake, thereby correcting the shake.

There will now be described some examples of the combination of the first lens G1 and the second lens G2 in accordance with the first preferred embodiment mentioned above.

Example 1 of the first preferred embodiment is shown in Tables 1 and 2.

Table 1 shows a geometric size of the lens configuration in Example 1. The radii of curvatures of the lenses G1 and G2 are set to $r1=-1572.25$ mm, $r2=r3=427.49$ mm, and $r4=-589.00$ mm. The thicknesses of the lenses G1 and G2 are set to $d1=3.00$ mm and $d3=10.89$ mm. The space between the lenses G1 and G2 is set to $d2=0.50$ mm.

Table 2 shows materials and characteristics of the lens G1 and G2. The lens G1 is formed of glass represented by LAL52 which is a symbol defined by Ohara, Inc., and has a refractive index nd of 1.67000 and an Abbe number Vd of 57.4. The lens G2 is formed of PMMA resin, and has a refractive index nd of 1.49194 and an Abbe number Vd of 56.1.

In examining the optical system shown in Tables 1 and 2 in the light of the above-mentioned conditions, the following results are provided.

$Vd1-Vd2=57.4-56.1=1.3$, which satisfies Condition 1.

$r2=r3=427.49$ mm, which satisfies Condition 2.

The focal length f of the lens G2 becomes equal to 505.3 mm in the above configuration, which satisfies Condition 3.

$r4=-589.00$ mm, which satisfies Condition 4.

The synthetic focal length of the combined lens G1 and lens G2 in the above configuration forms an afocal system, which satisfies Condition 5.

Accordingly, it is understood that the optical system in Example 1 is suitable for the image stabilizing optical device of the present invention.

TABLE 1

Configuration of the lenses in Example 1 of the first preferred embodiment

| Radius of Curvature (mm) | | Thickness and Space (mm) | |
| --- | --- | --- | --- |
| r1 | −1572.25 | d1 | 3.00 |
| r2 | 427.49 | d2 | 0.50 |
| r3 | 427.49 | d3 | 10.89 |
| r4 | −589.00 | | |

TABLE 2

Materials and characteristics of the lenses in Example 1
of the first preferred embodiment

| Lens | Material | Refractive Index: nd | Abbe Number: Vd |
|---|---|---|---|
| G1 | LAL52* | 1.67000 | 57.4 |
| G2 | PMMA | 1.49194 | 56.1 |

*: Symbol by Ohara, Inc.

FIGS. 6A to 6G and FIGS. 7A to 7G show aberrations in Example 1.

FIGS. 6A to 6G show aberrations on an image forming surface when the lens G2 is in a proper position on the optical axis in an optical system configured by mounting a lens with extremely low aberrations having a focal length of 120 mm and a brightness F2 on the imaging lens side of the lens configuration shown in Tables 1 and 2. More specifically, FIG. 6A shows a transverse aberration DY in the Y-direction at a central position; FIG. 6B shows a transverse aberration DY in the Y-direction at a position spaced a distance of 3.85 mm from the center; and FIG. 6C shows a transverse aberration DY in the Y-direction at a position spaced a distance of 5.5 mm from the center. Further, FIG. 6D shows a transverse aberration DX in the X-direction at the central position; FIG. 6E shows a transverse aberration DX in the X-direction at a position spaced a distance of 3.85 mm from the center; and FIG. 6F shows a transverse aberration DX in the X-direction at a position spaced a distance of 5.5 mm from the center. Further, FIG. 6G shows an astigmatism AS in the sagittal direction S and the tangential direction T. The wavelength of the rays of light is 587.56 nm, and the same wavelength applies to the following description.

FIGS. 7A to 7G show aberrations on the image forming surface when the lens G2 is rotated 0.835° to be moved a distance of 6.23 mm under the same conditions as those in FIGS. 6A to 6G to move the image on the image forming surface by a distance of 1.5 mm. More specifically, FIG. 7A shows a transverse aberration DY in the Y-direction at the central position; FIG. 7B shows a transverse aberration DY in the Y-direction at a position spaced a distance of 3.85 mm from the center; and FIG. 7C shows a transverse aberration DY in the Y-direction at a position spaced a distance of 5.5 mm from the center. Further, FIG. 7D shows a transverse aberration DX in the X-direction at the central position; FIG. 7E shows a transverse aberration DX in the X-direction at a position spaced a distance of 3.85 mm from the center; and FIG. 7F shows a transverse aberration DX in the X-direction at a position spaced a distance of 5.5 mm from the center. Further, FIG. 7G shows an astigmatism AS in the sagittal direction S and the tangential direction T.

From data of the aberrations shown in FIGS. 6A to 6G and FIGS. 7A to 7G, it is understood that the aberrations occurred when the image is moved 1.5 mm on the image forming surface are not largely increased in comparison with the aberrations when the lens G2 is in the proper position on the optical axis. Thus, also from this point of view, it is confirmed that the optical system in Example 1 is suitable for the image stabilizing optical device of the present invention.

Example 2 of the first preferred embodiment is shown in Tables 3 and 4.

Table 3 shows a geometric size of the lens configuration in Example 2. The radii of curvatures of the lenses G1 and G2 are set to r1=−1473.74 mm, r2=r3=333.44 mm, and r4=−654.00 mm. The thicknesses of the lenses G1 and G2 are set to d1=3.00 mm and d3=8.70 mm. The space between the lenses G1 and G2 is set to d2=0.50 mm.

Table 4 shows materials and characteristics of the lens G1 and G2. The lens G1 is formed of glass represented by BSM2 which is a symbol defined by Ohara, Inc., and has a refractive index nd of 1.60738 and an Abbe number Vd of 56.8. The lens G2 is formed of PMMA resin, and has a refractive index nd of 1.49194 and an Abbe number Vd of 56.1.

In examining the optical system shown in Tables 3 and 4 in the light of the above-mentioned conditions, the following results are provided.

Vd1−Vd2=56.8−56.1=0.7, which satisfies Condition 1.
r2=r3=333.44 mm, which satisfies Condition 2.

The focal length f of the lens G2 becomes equal to 450.2 mm in the above configuration, which satisfies Condition 3.

r4=−654.00 mm, which satisfies Condition 4.

The synthetic focal length of the combined lens G1 and lens G2 in the above configuration forms an afocal system, which satisfies Condition 5.

Accordingly, it is understood that the optical system in Example 2 is suitable for the image stabilizing optical device of the present invention.

TABLE 3

Configuration of the lenses in Example 2 of the first preferred embodiment

| Radius of Curvature (mm) | | Thickness and Space (mm) | |
|---|---|---|---|
| r1 | −1473.74 | d1 | 3.00 |
| r2 | 333.44 | d2 | 0.50 |
| r3 | 333.44 | d3 | 8.70 |
| r4 | −654.00 | | |

TABLE 4

Materials and characteristics of the lenses in Example 2
of the first preferred embodiment

| Lens | Material | Refractive Index: nd | Abbe Number: Vd |
|---|---|---|---|
| G1 | BSM2* | 1.60738 | 56.8 |
| G2 | PMMA | 1.49194 | 56.1 |

*: Symbol by Ohara, Inc.

FIGS. 8A to 8G and FIGS. 9A to 9G show aberrations in Example 2.

FIGS. 8A to 8G show aberrations on an image forming surface when the lens G2 is in a proper position on the optical axis in an optical system configured by mounting a lens with extremely low aberrations having a focal length of 120 mm and a brightness F2 on the imaging lens side of the lens configuration shown in Tables 3 and 4. More specifically, FIG. 8A shows a transverse aberration DY in the Y-direction at a central position; FIG. 8B shows a transverse aberration DY in the Y-direction at a position spaced a distance of 3.85 mm from the center; and FIG. 8C shows a transverse aberration DY in the Y-direction at a position spaced a distance of 5.5 mm from the center. Further, FIG. 8D shows a transverse aberration DX in the X-direction at the central position; FIG. 8E shows a transverse aberration DX in the X-direction at a position spaced a distance of 3.85 mm from the center; and FIG. 8F shows a transverse aberration DX in the X-direction at a position spaced a distance of 5.5 mm from the center. Further, FIG. 8G shows an astigmatism AS in the sagittal direction S and the tangential direction T.

FIGS. 9A to 9G show aberrations on the image forming surface when the lens G2 is rotated 0.955° to be moved a distance of 5.56 mm under the same conditions as those in FIGS. 8A to 8G to move the image on the image forming surface by a distance of 1.5 mm. More specifically, FIG. 9A shows a transverse aberration DY in the Y-direction at the central position; FIG. 9B shows a transverse aberration DY in the Y-direction at a position spaced a distance of 3.85 mm from the center; and FIG. 9C shows a transverse aberration DY in the Y-direction at a position spaced a distance of 5.5 mm from the center. Further, FIG. 9D shows a transverse aberration DX in the X-direction at the central position; FIG. 9E shows a transverse aberration DX in the X-direction at a position spaced a distance of 3.85 mm from the center; and FIG. 9F shows a transverse aberration DX in the X-direction at a position spaced a distance of 5.5 mm from the center. Further, FIG. 9G shows an astigmatism AS in the sagittal direction S and the tangential direction T.

From data of the aberrations shown in FIGS. 8A to 8G and FIGS. 9A to 9G, it is understood that the aberrations occurred when the image is moved 1.5 mm on the image forming surface are not largely increased in comparison with the aberrations when the lens G2 is in the proper position on the optical axis. Thus, also from this point of view, it is confirmed that the optical system in Example 2 is suitable for the image stabilizing optical device of the present invention.

Example 3 of the first preferred embodiment is shown in Tables 5 and 6.

Table 5 shows a geometric size of the lens configuration in Example 3. The radii of curvatures of the lenses G1 and G2 are set to r1=−12520.03 mm, r2=r3=454.22 mm, and r4=−977.00 mm. The thicknesses of the lenses G1 and G2 are set to d1=3.00 mm and d3=10.89 mm. The space between the lenses G1 and G2 is set to d2=0.50 mm.

Table 6 shows materials and characteristics of the lens G1 and G2. The lens G1 is formed of glass represented by LAL14 which is a symbol defined by Ohara, Inc., and has a refractive index nd of 1.69680 and an Abbe number Vd of 55.5. The lens G2 is formed of PMMA resin, and has a refractive index nd of 1.49194 and an Abbe number Vd of 56.1.

In examining the optical system shown in Tables 5 and 6 in the light of the above-mentioned conditions, the following results are provided.

Vd1−Vd2=55.5−56.1=−0.6, which satisfies Condition 1.

r2=r3=454.22 mm, which satisfies Condition 2.

The focal length f of the lens G2 becomes equal to 631.9 mm in the above configuration, which satisfies Condition 3.

r4=−977.00 mm, which satisfies Condition 4.

The synthetic focal length of the combined lens G1 and lens G2 in the above configuration forms an afocal system, which satisfies Condition 5.

Accordingly, it is understood that the optical system in Example 3 is suitable for the image stabilizing optical device of the present invention.

TABLE 5

Configuration of the lenses in Example 3 of the first preferred embodiment

| Radius of Curvature (mm) | | Thickness and Space (mm) | |
|---|---|---|---|
| r1 | −12520.03 | d1 | 3.00 |
| r2 | 454.22 | d2 | 0.50 |
| r3 | 454.22 | d3 | 10.89 |
| r4 | −977.00 | | |

TABLE 6

Materials and characteristics of the lenses in Example 3 of the first preferred embodiment

| Lens | Material | Refractive Index: nd | Abbe Number: Vd |
|---|---|---|---|
| G1 | LAL14* | 1.69680 | 55.5 |
| G2 | PMMA | 1.49194 | 56.1 |

*: Symbol by Ohara, Inc.

FIGS. 10A to 10G and FIGS. 11A to 11G show aberrations in Example 3.

FIGS. 10A to 10G show aberrations on an image forming surface when the lens G2 is in a proper position on the optical axis in an optical system configured by mounting a lens with extremely low aberrations having a focal length of 120 mm and a brightness F2 on the imaging lens side of the lens configuration shown in Tables 5 and 6. More specifically, FIG. 10A shows a transverse aberration DY in the Y-direction at a central position; FIG. 10B shows a transverse aberration DY in the Y-direction at a position spaced a distance of 3.85 mm from the center; and FIG. 10C shows a transverse aberration DY in the Y-direction at a position spaced a distance of 5.5 mm from the center. Further, FIG. 10D shows a transverse aberration DX in the X-direction at the central position; FIG. 10E shows a transverse aberration DX in the X-direction at a position spaced a distance of 3.85 mm from the center; and FIG. 10F shows a transverse aberration DX in the X-direction at a position spaced a distance of 5.5 mm from the center. Further, FIG. 10G shows an astigmatism AS in the sagittal direction S and the tangential direction T.

FIGS. 11A to 11G show aberrations on the image forming surface when the lens G2 is rotated 0.985° to be moved a distance of 7.81 mm under the same conditions as those in FIGS. 10A to 10G to move the image on the image forming surface by a distance of 1.5 mm. More specifically, FIG. 11A shows a transverse aberration DY in the Y-direction at the central position; FIG. 11B shows a transverse aberration DY in the Y-direction at a position spaced a distance of 3.85 mm from the center; and FIG. 11C shows a transverse aberration DY in the Y-direction at a position spaced a distance of 5.5 mm from the center. Further, FIG. 11D shows a transverse aberration DX in the X-direction at the central position; FIG. 11E shows a transverse aberration DX in the X-direction at a position spaced a distance of 3.85 mm from the center; and FIG. 11F shows a transverse aberration DX in the X-direction at a position spaced a distance of 5.5 mm from the center. Further, FIG. 11G shows an astigmatism AS in the sagittal direction S and the tangential direction T.

From data of the aberrations shown in FIGS. 10A to 10G and FIGS. 11A to 11G, it is understood that the aberrations occurred when the image is moved 1.5 mm on the image forming surface are not largely increased in comparison with the aberrations when the lens G2 is in the proper position on the optical axis. Thus, also from this point of view, it is confirmed that the optical system in Example 3 is suitable for the image stabilizing optical device of the present invention.

Second Preferred Embodiment

Figure 2A:
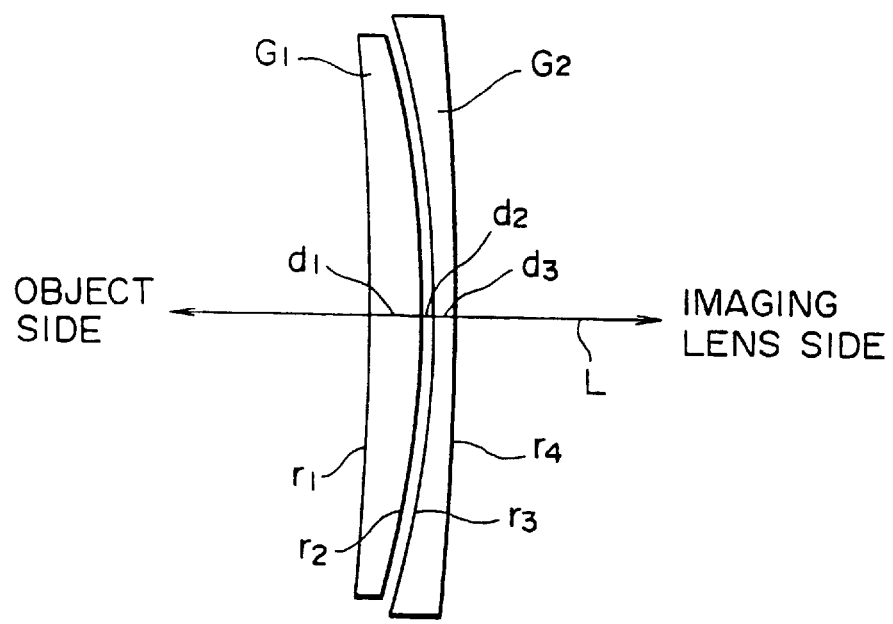
FIG. 2A is a sectional side view showing the configuration of a second preferred embodiment of the optical system of the image stabilizing optical device according to the present invention.
Figure 2B:
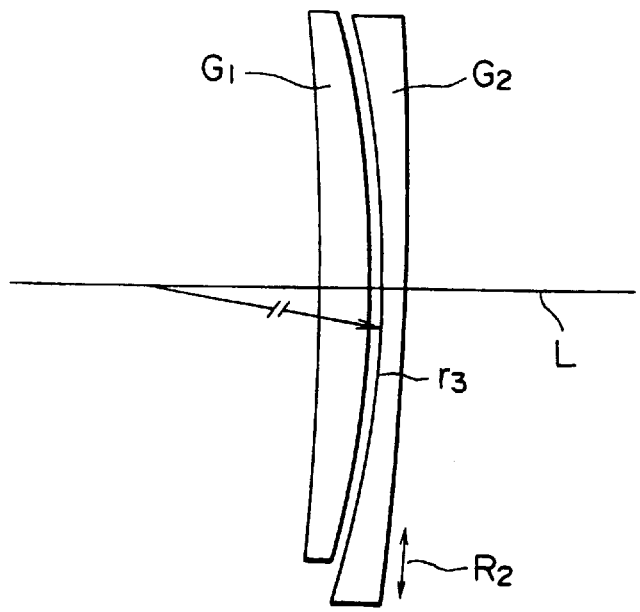
FIG. 2B is a view similar to FIG. 2A, showing the operation of the second preferred embodiment.

FIGS. 2A and 2B show a second preferred embodiment of the present invention. As shown in FIG. 2A, a first lens G1 located on the object side is a meniscus lens having a radius of curvature r1 whose sign is minus and a radius of curvature r2 whose sign is minus. A second lens G2 located on the imaging lens side is a meniscus lens having a radius of curvature r3 whose sign is minus and a radius of curvature r4 whose sign is minus. The first and second lenses G1 and G2 are combined so as to have the same optical axis L. The first lens G1 has a thickness d1 at its center, and the second lens G2 has a thickness d3 at its center. The first and second lenses G1 and G2 are spaced a distance d2 from each other.

FIG. 2B shows a condition that the second lens G2 is rotated in the direction of an arrow R2 about the center of the curvature whose radius is r3 to adjust an optical path of incident light. Although not shown in FIG. 2B, the direction of rotation of the second lens G2 also includes a direction perpendicular to the arrow R2 (i.e., a direction perpendicular to the sheet plane of FIG. 2B). Thus, the lens G2 is designed to rotate in a direction toward an arbitrary position present in a plane perpendicular to the optical axis L.

In this preferred embodiment, the rotatable second lens G2 is formed of PC (polycarbonate) resin which is light in weight. In consideration of Condition 1 mentioned above in the first preferred embodiment, the first lens G1 may be formed of glass represented by the symbol defined by Shot, Inc.

In the second preferred embodiment, the conditions on configuration of the lenses, the configuration and operation of a control mechanism, a control system, and so on are the same as those mentioned above in the first preferred embodiment, so the description thereof will be omitted herein.

Example of the second preferred embodiment is shown in Tables 7 and 8.

Table 7 shows a geometric size of the lens configuration in Example. The radii of curvatures of the lenses G1 and G2 are set to r1=−346.10 mm, r2=r3=−184.82 mm, and r4=−425.00 mm. The thicknesses of the lenses G1 and G2 are set to d1=5.49 mm and d3=5.00 mm. The space between the lenses G1 and G2 is set to d2=1.00 mm.

Table 8 shows materials and characteristics of the lens G1 and G2. The lens G1 is formed of glass represented by PBM35 which is a symbol defined by Ohara, Inc., and has a refractive index nd of 1.69895 and an Abbe number Vd of 30.1. The lens G2 is formed of PC resin, and has a refractive index nd of 1.58362 and an Abbe number Vd of 30.4.

In examining the optical system shown in Tables 7 and 8 in the light of the above-mentioned conditions, the following results are provided.

Vd1−Vd2=30.1−30.4=−0.3, which satisfies Condition 1.

r2=r3==−184.82 mm, which satisfies Condition 2.

The focal length f of the lens G2 becomes equal to −564.7 mm in the above configuration, which satisfies Condition 3.

r4=−425.00 mm, which satisfies Condition 4.

The synthetic focal length of the combined lens G1 and lens G2 in the above configuration forms an afocal system, which satisfies Condition 5.

Accordingly, it is understood that the optical system in Example is suitable for the image stabilizing optical device of the present invention.

TABLE 7

Configuration of the lenses in Example of the second preferred embodiment

| Radius of Curvature (mm) | | Thickness and Space (mm) | |
|---|---|---|---|
| r1 | −346.10 | d1 | 5.49 |
| r2 | −184.82 | d2 | 1.00 |
| r3 | −184.82 | d3 | 5.00 |
| r4 | −425.00 | | |

TABLE 8

Materials and characteristics of the lenses in Example of the second preferred embodiment

| Lens | Material | Refractive Index: nd | Abbe Number: Vd |
|---|---|---|---|
| G1 | PBM35* | 1.69895 | 30.1 |
| G2 | PC | 1.58362 | 30.4 |

*: Symbol by Ohara, Inc.

FIGS. 12A to 12G and FIGS. 13A to 13G show aberrations in Example.

FIGS. 12A to 12G show aberrations on an image forming surface when the lens G2 is in a proper position on the optical axis in an optical system configured by mounting a lens with extremely low aberrations having a focal length of 120 mm and a brightness F2 on the imaging lens side of the lens configuration shown in Tables 7 and 8. More specifically, FIG. 12A shows a transverse aberration DY in the Y-direction at a central position; FIG. 12B shows a transverse aberration DY in the Y-direction at a position spaced a distance of 3.85 mm from the center; and FIG. 12C shows a transverse aberration DY in the Y-direction at a position spaced a distance of 5.5 mm from the center. Further, FIG. 12D shows a transverse aberration DX in the X-direction at the central position; FIG. 12E shows a transverse aberration DX in the X-direction at a position spaced a distance of 3.85 mm from the center; and FIG. 12F shows a transverse aberration DX in the X-direction at a position spaced a distance of 5.5 mm from the center. Further, FIG. 12G shows an astigmatism AS in the sagittal direction S and the tangential direction T.

FIGS. 13A to 13G show aberrations on the image forming surface when the lens G2 is rotated 2.12° to be moved a distance of 6.84 mm under the same conditions as those in FIGS. 12A to 12G to move the image on the image forming surface by a distance of 1.5 mm. More specifically, FIG. 13A shows a transverse aberration DY in the Y-direction at the central position; FIG. 13B shows a transverse aberration DY in the Y-direction at a position spaced a distance of 3.85 mm from the center; and FIG. 13C shows a transverse aberration DY in the Y-direction at a position spaced a distance of 5.5 mm from the center. Further, FIG. 13D shows a transverse aberration DX in the X-direction at the central position; FIG. 13E shows a transverse aberration DX in the X-direction at a position spaced a distance of 3.85 mm from the center; and FIG. 13F shows a transverse aberration DX in the X-direction at a position spaced a distance of 5.5 mm from the center. Further, FIG. 13G shows an astigmatism AS in the sagittal direction S and the tangential direction T.

From data of the aberrations shown in FIGS. 12A to 12G and FIGS. 13A to 13G, it is understood that the aberrations occurred when the image is moved 1.5 mm on the image forming surface are not largely increased in comparison with the aberrations when the lens G2 is in the proper position on the optical axis. Thus, also from this point of view, it is confirmed that the optical system in Example is suitable for the image stabilizing optical device of the present invention.

It is to be noted that the configuration of the optical system of the present invention is not limited to that in the above-mentioned four examples, but any configurations satisfying the above-mentioned conditions may be adopted.

By using the image stabilizing optical device of the present invention, shake which may occur may be corrected for in a range of extremely low aberrations. Further, also in a no shake situation almost no aberrations may occur due to the insertion of the shake correcting optical system, thus preventing degradation of an image formed. Further, since the control lens is formed of a lightweight material, a high-speed response performance can be improved. Further, the image stabilizing optical device of the present invention is detachable to the front end of an imaging lens of an existing imaging device. Accordingly, the imaging device having no shake correcting function can simply attain an image stabilizing function by mounting the shake correcting optical system of the present invention thereto.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An image stabilizing optical device comprising:

a housing;

an optical system comprising a first lens located on an object side and a second lens located on an imaging lens side, said first lens and said second lens being opposed to each other with a small space defined therebetween, opposed surfaces of said first lens and said second lens having the same curvature;

a rotating means located on the same center of curvature of said first and second lenses, for moving said second lens independently in two perpendicular axial directions in a plane perpendicular to an optical axis of said optical system; and a shake detecting means for detecting shakes in said two perpendicular axial directions;

said optical system being located in front of an imaging lens of an imaging device in proximity to said imaging lens;

said rotating means being driven according to a result of detection from said shake detecting means to control an optical path of light incident on said optical system;

wherein said first lens is fixed in said housing and said second lens is supported in said housing so as to be rotatable in said two perpendicular axial directions in said plane perpendicular to said optical axis; and wherein said rotating means comprises a fixed frame fixed in said housing, a first frame having one end for fixedly supporting said second lens, and a second frame for supporting the other end of said first frame so that said first frame is rotatable as a whole in a pitching direction, said fixed frame supporting said second frame so that said second frame supporting said first frame is rotatable as a whole in a yawing direction.

2. An image stabilizing optical device according to claim 1, wherein said rotating means comprises:

a first gear fixed to said first frame and adapted to rotate with said first frame;

a first motor fixed to said second frame and having a rotating shaft on which a second gear is mounted and meshes with said first gear to generate torque for rotating said first gear in said pitching direction;

a third gear fixed to said second frame and adapted to rotate with said second frame; and a second motor fixed to said fixed frame and having a rotating shaft on which a fourth gear is mounted and meshes with said third gear to generate torque for rotating said third gear in said yawing direction.

3. An image stabilizing optical device comprising:

an optical system comprising a first lens located on an object side and a second lens located on an imaging lens side, said first lens and said second lens being opposed to each other with a small space defined therebetween, opposed surfaces of said first lens and said second lens having the same curvature, in which a focal length f of said second lens satisfies a condition of 400 mm<|f|<700 mm;

a rotating means located on the same center of curvature of said first and second lenses, for moving said second lens independently in two perpendicular axial directions in a plane perpendicular to an optical axis of said optical system; and a shake detecting means for detecting shakes in said two perpendicular axial directions;

said optical system being located in front of an imaging lens of an imaging device in proximity to said imaging lens;

said rotating means being driven according to a result of detection from said shake detecting means to control an optical path of light incident on said optical system.

4. An image stabilizing optical device comprising:

an optical system comprising a first lens located on an object side and a second lens located on an imaging lens side, said first lens and said second lens being opposed to each other with a small space defined therebetween, opposed surfaces of said first lens and said second lens having the same curvature, in which said first lens is formed of glass and said second lens is formed of polycarbonate resin;

a rotating means located on the same center of curvature of said first and second lenses, for moving said second lens independently in two perpendicular axial directions in a plane perpendicular to an optical axis of said optical system; and a shake detecting means for detecting shakes in said two perpendicular axial directions;

said optical system being located in front of an imaging lens of an imaging device in proximity to said imaging lens;

said rotating means being driven according to a result of detection from said shake detecting means to control an optical path of light incident on said optical system.

5. An image stabilizing optical device comprising:

an optical system comprising a first lens located on an object side and a second lens located on an imaging lens side, said first lens and said second lens being opposed to each other with a small space defined therebetween, opposed surfaces of said first lens and said second lens having the same curvature, in which said first lens is formed of glass and said second lens is formed of polymethyl methacrylate resin;

a rotating means located on the same center of curvature of said first and second lenses, for moving said second lens independently in two perpendicular axial directions in a plane perpendicular to an optical axis of said optical system; and a shake detecting means for detecting shakes in said two perpendicular axial directions;

said optical system being located in front of an imaging lens of an imaging device in proximity to said imaging lens;

said rotating means being driven according to a result of detection from said shake detecting means to control an optical path of light incident on said optical system.

* * * * *